J. L. COPPING.
MONKEY WRENCH.
APPLICATION FILED MAR. 29, 1918.
1,275,855.
Patented Aug. 13, 1918.
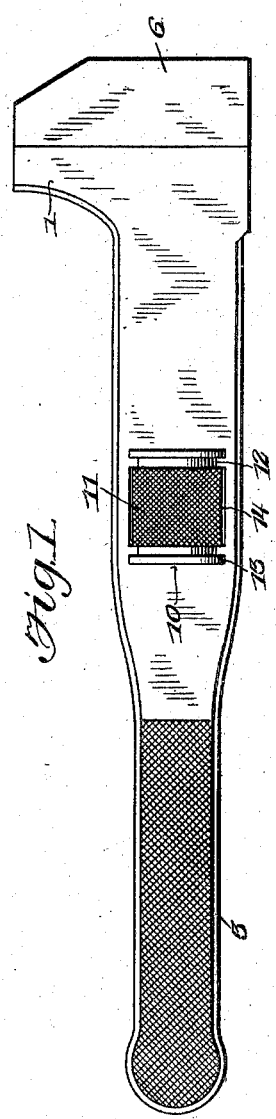
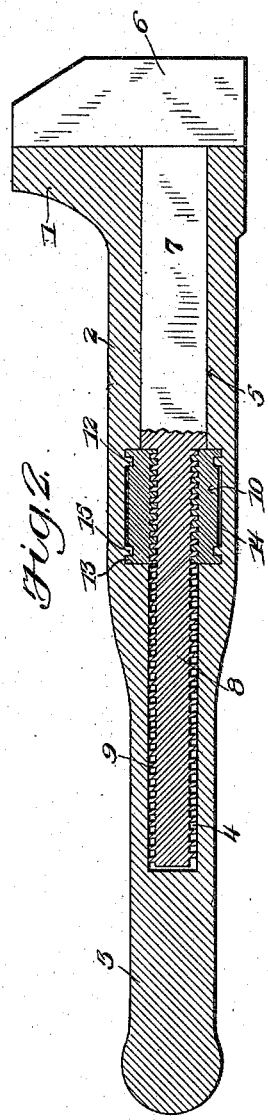
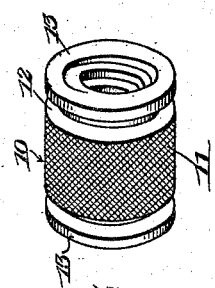
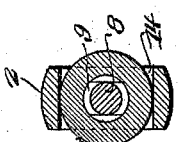
Witnesses
J.H. Crawford
Inventor
J.L. Copping,
By Victor J. Evans
Attorney

UNITED STATES PATENT OFFICE.

JOHN L. COPPING, OF NEW ORLEANS, LOUISIANA.

MONKEY-WRENCH.

1,275,855.  Specification of Letters Patent.  Patented Aug. 13, 1918.

Application filed March 29, 1918. Serial No. 225,541.

*To all whom it may concern:*

Be it known that I, JOHN L. COPPING, a citizen of the United States, residing at New Orleans, in the county of Orleans and State of Louisiana, have invented new and useful Improvements in Monkey - Wrenches, of which the following is a specification.

This invention relates to improvements in wrenches.

An object of the invention is to simplify and improve the existing art by producing a monkey wrench having means for relieving the movable jaw actuating nut from undue strain as well as for permitting the ready turning of the nut by the operator.

Other objects and advantages will appear as the nature of the invention is better understood, reference being had to the accompanying drawings, in which, Figure 1 is a side elevation of a wrench constructed in accordance with this invention.

Fig. 2 is an approximately central longitudinal sectional view through the same.

Fig. 3 is an approximately central sectional view through the stationary jaw and the shank thereof.

Fig. 4 is a perspective view of the nut.

The stationary jaw is indicated by the numeral 1 and is integrally formed with an angular shank 2 that terminates in a handle 3. The handle is provided with a round bore 4 that communicates with a square or rectangular passage 5, in the shank 2 which passage communicates with the jaw head 1.

It is to be understood that if desired the jaw 1 and the shank and handle associated therewith may be formed of two parts, connected by rivets or bolts, if desired.

The numeral 6 designates the movable jaw formed with the cross sectionally square or rectangular shank 7 that is designed to be received in the passage 5, while formed on the end of the said shank 7 and co-extensive therewith is a reduced extension 8, two of the diametrically opposite sides or edges of which being rounded and said round portions being threaded, as at 9. The bore 4 is shaped to snugly receive the shank extension 9.

The threaded extension 9 of the shank 7 is engaged by an operating nut 10. This nut has a round periphery and is centrally provided with a large milled portion 11, the reduced portions 12 extending from the milled portions 11 having their ends formed with annular flanges 13. The shank 2 of the stationary jaw is provided with a transverse opening to receive the nut 10, the said opening being indicated by the numeral 14, and the diametrically opposite side walls provided by the opening are formed with inturned lugs 15 that are received in the grooves or channels provided by the portions 12 between the body 11 and the flanges 13 on the nut 10.

It will be thus noted that the nut is effectively housed in the wrench, the flanges 13 providing the bearings therefor, so that the central and milled portion 11 of the said nut is not contacted by the side walls of the opening 14. This permits of the free turning of the nut and also the said nut comprising a substantially elongated member effectively co-engages with the threads of the shank extension 8 to positively coöperate therewith. It is believed, from the foregoing that the simplicity and advantages of the construction will be apparent without further detailed description.

Having thus described the invention, what I claim is:

In a wrench, the combination with a stationary jaw having a shank provided with a handle extension, said shank having a substantially rectangular passage communicating with the head thereof, said handle having a reduced and round bore communicating with the passage, said shank, at the juncture of the passage with the bore having a transverse opening, longitudinal walls provided thereby, adjacent the end walls thereof having parallel lugs directed into the opening, a movable jaw having a rectangular shank received in the passage and having a round threaded extension on said shank designed to be received in the bore of the stationary member of the wrench, a nut for engaging the threaded extension and the shank of the stationary jaw, said nut comprising a cross sectionally round member including a central portion having its periphery milled and annular flanges spaced outward from the ends of the said milled portion, and the space between the milled portion and the flanges adapted to receive the referred to lugs, and the said transverse opening in the shank of the stationary jaw being deepest between the inner sides of the lugs, whereby the milled portion of the nut will be retained out of contact with the longitudinal walls provided by the opening in the said shank of the stationary jaw.

In testimony whereof I affix my signature.

JOHN L. COPPING.